US008702416B2

(12) United States Patent
Israel

(10) Patent No.: US 8,702,416 B2
(45) Date of Patent: Apr. 22, 2014

(54) METHOD AND APPARATUS FOR MAKING CANDLES, VASES OR DECORATIVE OBJECTS

(76) Inventor: J. Vance Israel, Baltimore, MD (US)

( * ) Notice: Subject to any disclaimer, the term of this patent is extended or adjusted under 35 U.S.C. 154(b) by 0 days.

(21) Appl. No.: 13/276,579

(22) Filed: Oct. 19, 2011

(65) Prior Publication Data

US 2012/0093963 A1 Apr. 19, 2012

Related U.S. Application Data

(63) Continuation of application No. 11/000,384, filed on Dec. 1, 2004, now abandoned.

(51) Int. Cl.
*B29C 45/16* (2006.01)
*B29C 41/06* (2006.01)

(52) U.S. Cl.
USPC ........... 425/267; 425/402; 425/435; 425/441; 425/447; 425/451.9; 425/454; 425/803; 249/120; 249/137

(58) Field of Classification Search
USPC .............. 425/267, 402, 435, 451.9, 453, 454, 425/803, DIG. 32, 403, 441, 447; 249/117, 249/120, 137; 264/71, 245, 310
See application file for complete search history.

(56) References Cited

U.S. PATENT DOCUMENTS

| | | | | |
|---|---|---|---|---|
| 1,857,003 | A * | 5/1932 | Poore | 425/453 |
| 3,364,978 | A * | 1/1968 | Toyosuke et al. | 164/114 |
| 3,811,646 | A * | 5/1974 | Beasley | 249/144 |
| 3,854,705 | A * | 12/1974 | Shaff | 366/98 |
| 3,886,252 | A | 5/1975 | Eker et al. | |
| 3,899,566 | A * | 8/1975 | Murray | 264/245 |
| 4,005,961 | A * | 2/1977 | Manceau | 425/190 |
| 4,104,357 | A | 8/1978 | Blair | |
| 6,129,771 | A | 10/2000 | Ficke et al. | |
| 6,878,319 | B2 * | 4/2005 | Browne et al. | 264/71 |
| 2001/0039254 | A1 * | 11/2001 | Browne et al. | 510/440 |
| 2002/0185781 | A1 | 12/2002 | Santis | |
| 2003/0018387 | A1 * | 1/2003 | Schuessler | 623/8 |

FOREIGN PATENT DOCUMENTS

| | | |
|---|---|---|
| AT | 320109 | 1/1975 |
| AT | 349120 | 3/1979 |
| DE | 2321391 | 11/1974 |

OTHER PUBLICATIONS

Translation of Koch (DE 232391).*

* cited by examiner

*Primary Examiner* — Dimple Bodawala

(74) *Attorney, Agent, or Firm* — Michael R. Schacht; Schacht Law Office, Inc.

(57) ABSTRACT

Making candles, vases or ornamental articles, by rotating a mold in elevation and azimuth, pouring wax into the mold, allowing the wax to partially or completely harden, and repeating these steps to build up layers of wax in different inclined planes. Apparatus is described for carrying out this method, having a support rotatable in elevation and a mold holder rotatable in azimuth on the support. An alternative apparatus is described having a vessel that may be optionally temperature controlled and containing flowable material supporting a mold. Further apparatus is described having means to support a mold at variable angles of elevation and azimuth. The apparatus and materials for carrying out the method may be supplied as a kit, with the apparatus either fully assembled or supplied as separate parts to be assembled by the user.

16 Claims, 8 Drawing Sheets

METHOD AND APPARATUS FOR MAKING CANDLES, VASES OR DECORATIVE OBJECTS

RELATED APPLICATIONS

This application, U.S. Patent Application Ser. No. 13/276,579 filed Oct. 19, 2011, is a continuation of U.S. Patent Application Ser. No. 11/000,384 filed Dec. 1, 2003, now abandoned, the contents of which are incorporated herein by reference.

BACKGROUND OF THE INVENTION

1. Field of the Invention

The invention relates to a method and apparatus for making candles, vases or decorative objects. More particularly, die invention relates to a method and apparatus for making candles having a plurality of intersecting planes of different colors.

2. Discussion of the Background

Candles have been used for thousands of years for illumination, for religious rituals and for decoration. Numerous shapes, sizes and colors have been produced. Multi-colored candles have even been produced.

Candles may be made either by dipping or by pouring. To make candles by dipping, a wick is repeatedly dipped into molten wax to build up successive layers. To make candles by pouring, molten wax is poured into a mold.

Novel apparatus and methods will henceforth be described to produce multi-colored candles having an especially pleasing aesthetic appearance.

SUMMARY

Methods are disclosed for making candles, vases or other ornamental articles, by rotating a mold in elevation and azimuth, pouring wax or another suitable meltable substance into a mold, allowing the wax to partially or completely harden, and repeating these steps to build up layers of wax in different inclined planes.

Apparatus is described for carrying out these methods, having a support rotatable in elevation and a mold holder rotatable in azimuth on the support In an alternative embodiment, a mold is supported by flowable material in a container, optionally provided with temperature control means. Other embodiments are also disclosed, employing a stand and a backstop.

DETAILED DESCRIPTION

Figure 1:
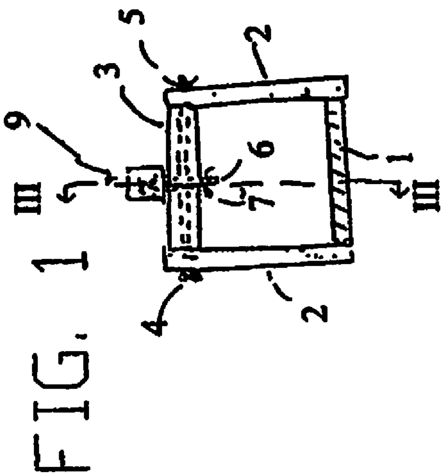
FIG. 1 is a front view of an apparatus according to a preferred embodiment of the invention.
Figure 2:
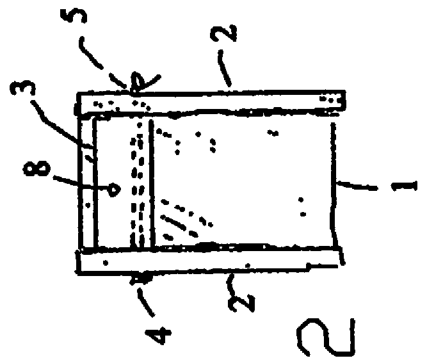
FIG. 2 is a plan view of an apparatus according to the embodiment of FIG. 1.
Figure 3:
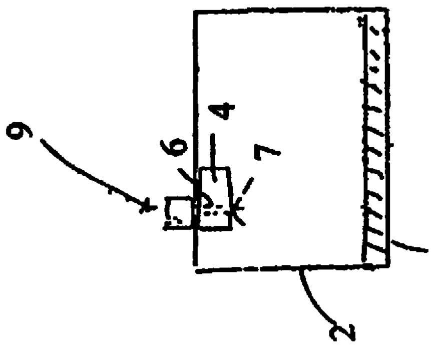
FIG. 3 is a sectional side view of the apparatus of FIG. 2 along line "III-III".

The apparatus shown in FIG. 1, FIG. 2 and FIG. 3 comprises a base 1, side walls 2, a support 3 with a hole 8, a first bolt 4, a first wing nut 5, a second bolt 6, a second wing nut 7 and a mold holder 9.

Figure 4:
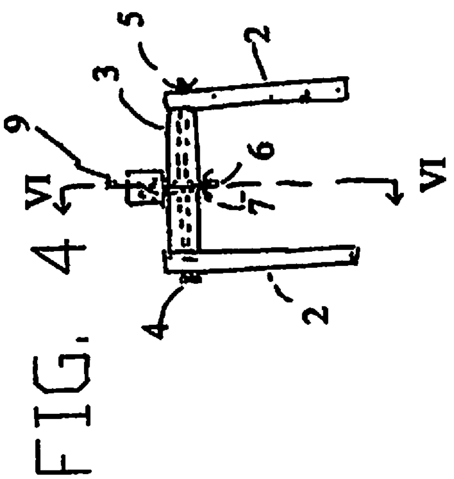
FIG. 4 is a front view of an apparatus according to another preferred embodiment of the invention.
Figure 5:
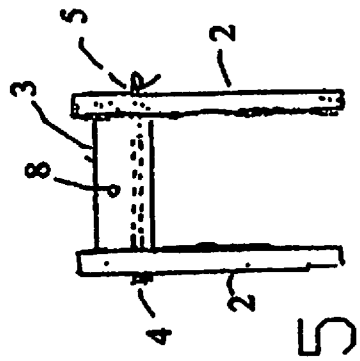
FIG. 5 is a plan view of an apparatus according to the embodiment of FIG. 4.
Figure 6:
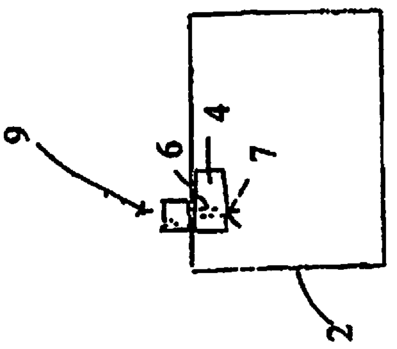
FIG. 6 is a sectional side view of the apparatus of FIG. 5 along line "VI-VI".

In FIG. 1, FIG. 2 and FIG. 3, base 1 links side walls 2. However, it has been found by experimentation, that the base 1 is not essential to the functioning of the apparatus, and indeed the apparatus may function better without the base 1, particularly on uneven or non-level surfaces. Accordingly, FIG. 4, FIG. 5 and FIG. 6 illustrate an embodiment of the apparatus with the base 1 omitted.

With reference to the accompanying figures, support 3 rotates in angle of elevation about bolt 4 and can be fixed at any angle by tightening wing nut 5. Mold holder 9 can be rotated in azimuth about bolt 6 and can be fixed in any position by wing nut 7. A mold (not shown) would be placed inside the mold holder 9. Alternatively, the mold may be mounted directly upon the support 3 without the mold holder 9.

Figure 7:
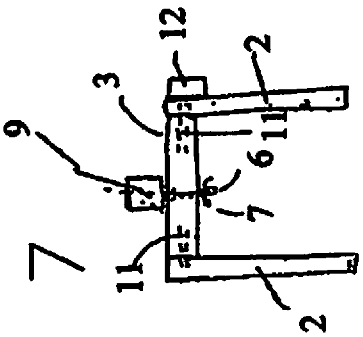
FIG. 7 is a front view of an apparatus according to another preferred embodiment of the invention.
Figure 8:
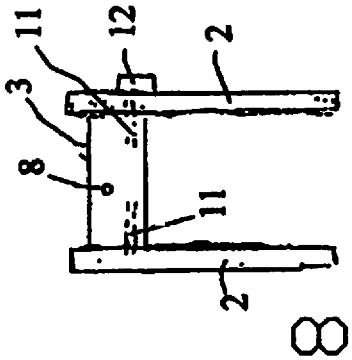
FIG. 8 is a plan view of an apparatus according to the embodiment of FIG. 7.
Figure 9:
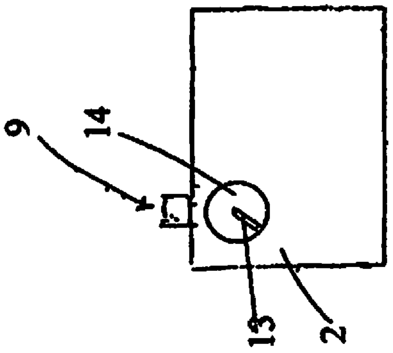
FIG. 9 is a side view of the apparatus of FIG. 8.

In a further embodiment, as shown in FIG. 7, FIG. 8 and FIG. 9, bolt 4 and wing nut 5 may be replaced by studs 11 in either side of support 3, and a knob 12 may be provided to adjust the angle of elevation of support 3. A pointer 13 and a graduated scale 14 may also be provided to indicate the angle of elevation of support 3, as shown in FIG. 9. Scale 14 is preferably independently movable, to allow for use of the apparatus of the invention on a surface that is not level. The graduations on scale 14 are omitted for clarity. A further pointer and scale (not shown) may also be employed in a similar way to indicate the direction of azimuthal rotation of the mold or the mold holder 9. It will be appreciated by those skilled in the art that any suitable fastening means may be used to fasten support 3 to side walls 2 and to attach mold holder 9 to support 3, and that, further, any suitable indicating means, such as a numerical display, may be employed to indicate the angles of elevation and azimuth.

The pictured mold holder 9 is rectilinear, but may be of any shape necessary to accommodate a candle mold (not shown). Depending on the size of support 3 and of the mold holders 9, any number of mold holders may be used on the same apparatus. Note that if a cylindrical mold holder is used, it need not be rotatable in the azimuth direction, rather the mold itself can rotate. Similarly for irregularly shaped molds, an adaptor with a circular cross section (not shown) may be fitted thereto, which would allow rotation of the mold.

The following method is appropriate for a vase or a decorative object as well as a candle. In the latter case it is assumed that a wick will be added by any of the usual methods.

To make a candle:

(1) The top (and bottom) surface(s) of support 3 are brought to the horizontal and fixed there by wing nut 5, and the mold holder 9 is rotated to and fixed at the desired position by wing nut 7.

(2) The desired amount of wax is poured into the mold, the support 3 is rotated to the desired angle and the wax is allowed to partially or completely harden.

(3) Steps 1 and 2 are repeated as often as desired.

Alternatively, a candle may be made by carrying out the following steps:

(1) The support 3 is rotated to the desired angle, and the mold holder 9 is rotated to and fixed at the desired position by wing nut 7.

(2) The desired amount of wax is poured into the mold, and the wax is allowed to partially or completely harden.

(3) Steps 1 and 2 are repeated as often as desired.

By following the above methods, multiple layers of wax may be deposited at various angles of elevation and azimuth. This can produces many pleasing aesthetic effects. It has been found that the best results may be obtained when the candle mold is composed of cardboard coated with polypropylene. To achieve the best effects, the wax should have just the right degree of adhesion to the mold, so that the wax does not withdraw from the mold before the next layer is deposited, but can be withdrawn from the mold when the candle is complete. Of course, other suitable materials may be used for the mold without departing from the scope of the invention.

Figure 12:
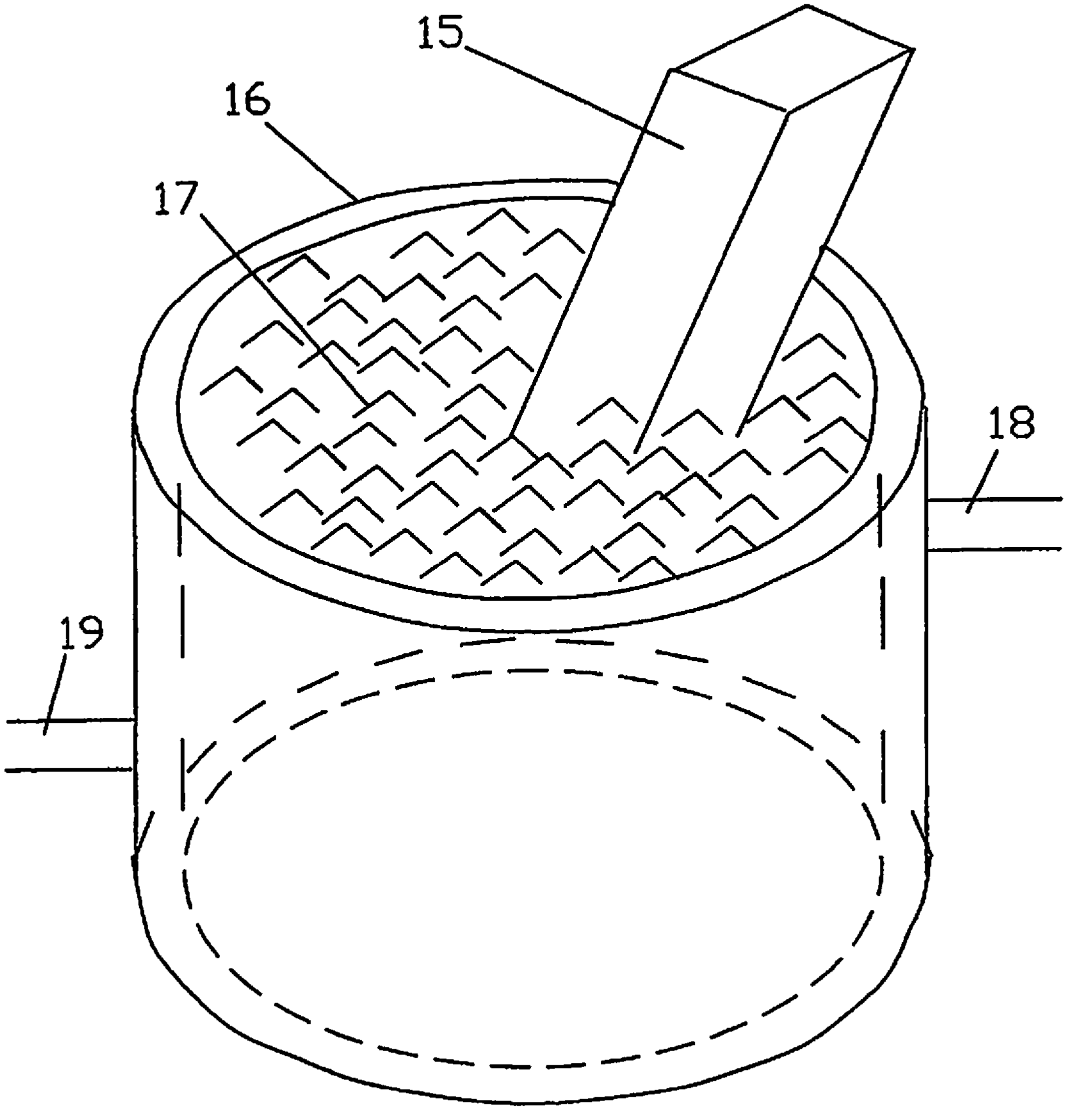
FIG. 12 is a view of an apparatus according to a further preferred embodiment of the invention.

FIG. 12 shows an alternative apparatus according to a preferred embodiment of the invention. A container 16 is at least partially filled with a flowable material 17 to support a mold 15 at an inclined angle of elevation. Flowable material 17 may comprise ice in crushed or cube form, or may be sand, and it will be apparent to those skilled in the art that various other suitable materials could be employed for this purpose. The container 16 may optionally be hollow and provided with ports 18 and 19 for introduction and removal of a liquid. The temperature of the liquid, and hence the temperature of the mold 15, may be controlled by any suitable means (not shown). In an illustrative example, the temperature control means may include a temperature sensor and a heater controlled thereby. Such temperature control means are well known in the art. With this apparatus, the method of the invention may be carried out by inserting the mold 15 into the container 16 at successive angles of azimuth and elevation, and pouring wax into the mold in each position.

Figure 13:
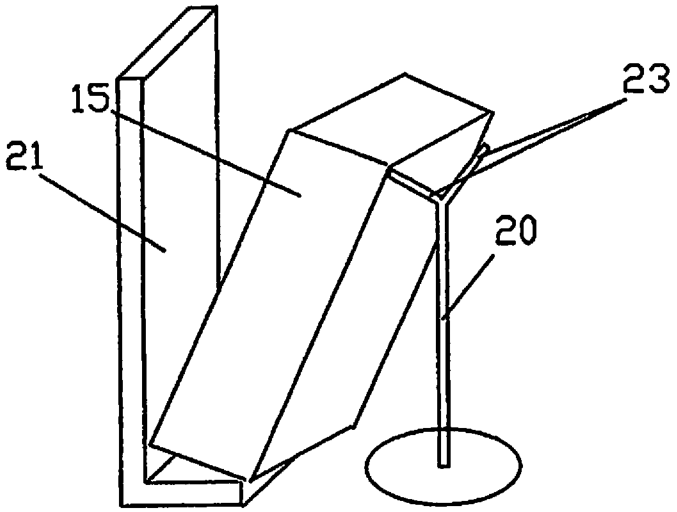
FIG. 13 is a view of an apparatus according to yet another preferred embodiment of the invention.

FIG. 13 shows a mold 15 supported between an extensible stand 20 and a backstop 21. In this embodiment, the height of the stand 20 is adjusted to vary the angle of elevation of the mold 15. The height of the stand 20 may be adjusted by any suitable means known in the art. For example, it may be an extensible or telescoping stand, and it may be locked at a particular height by a locking nut, or a locking pin, or by a ratchet, or a clamp, or any suitable means employing friction or springs or a positive fastener. Such locking means are omitted for clarity. Stand 20 is provided at it's upper end with a clamp 23, which may be of any suitable shape, and which may be fixed or opposable, and may optionally be retained on the mold 15 by any suitable threaded or sprung means known in the art (not shown). The angle of azimuth of the mold 15 may be rotated in relation to the clamp 23 of the stand 20. Backstop 21 is intended to retain the lower end of the mold 15 against unwanted lateral movement, and may be provided, for example, with a rubber or other suitable non-slip surface (not shown) on the underside thereof. Backstop 21 is shown as L-shaped, but may be any other suitable shape.

Figure 14:
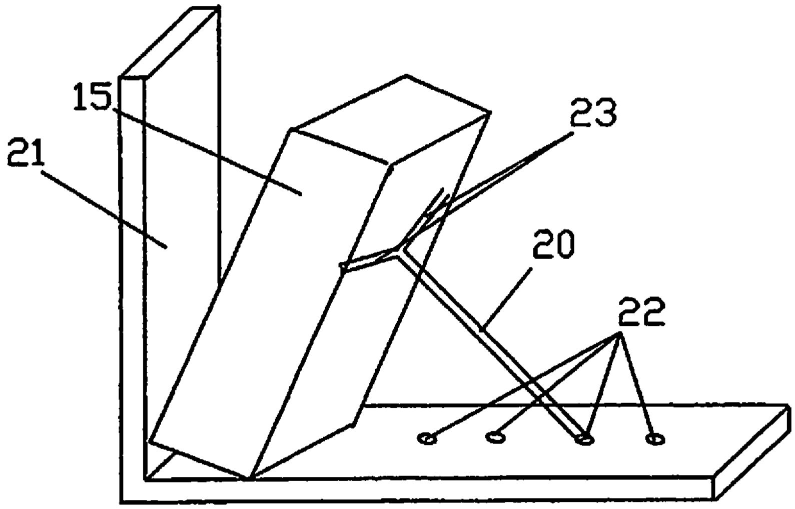
FIG. 14 is a view of an apparatus according to still another preferred embodiment of the invention.
Figure 15:
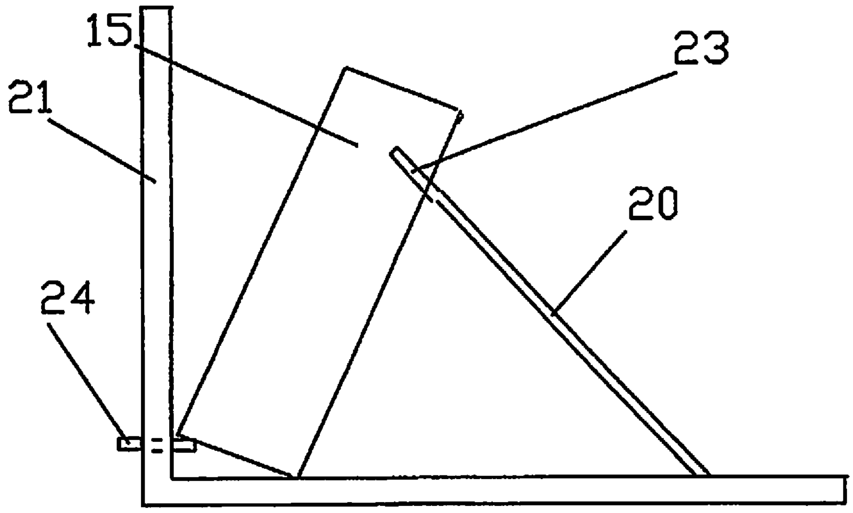
FIG. 15 is a view of an apparatus according to still another preferred embodiment of the invention.

FIG. 14 shows a further variation, in which stand 20 may be of fixed length, but is inserted into one of a plurality of holes 22 in backstop 21, thus permitting the stand 20 to prop the mold 15 at various angles of elevation. It will be appreciated by those skilled in the art that grooves or depressions of any suitable shape may be substituted for the holes 22 without departing from the scope of the invention. A peg 24 may optionally be inserted through the backstop 21 to support the mold 15, as shown in FIG. 15. Alternatively, wedges or shims (not shown) may be placed under the mold 15 instead of peg 24.

Figure 10:
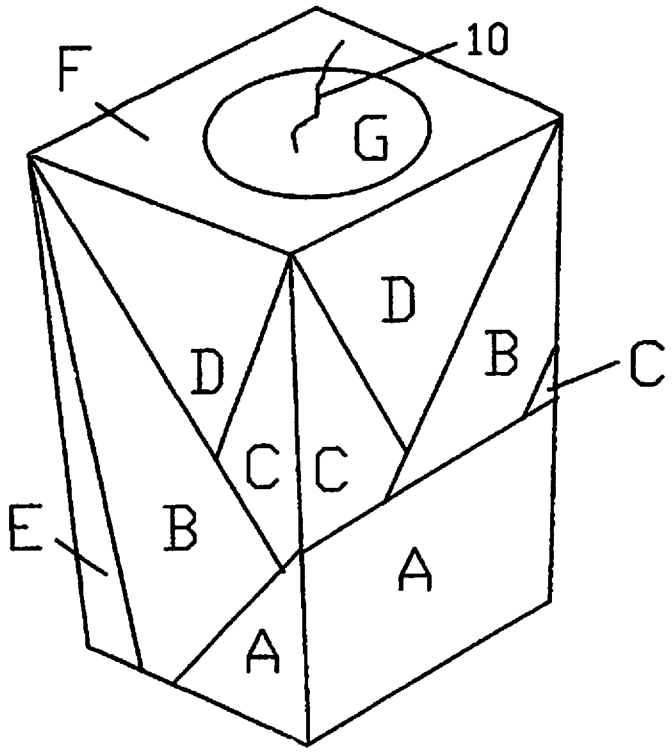
FIG. 10 is a pictorial view of an illustrative example of a candle made according to a preferred method of the invention.

FIG. 10 shows an example of a candle made by the method and using the apparatus of the invention. Areas A, B, C, D, E, F and G each represent areas of wax of different colors. Note that the circular area G is produced by other conventional means, and is not part of the present invention (a circular depression tends to form in the center of the candle, and this can be filled with wax by any suitable method to form area G). A wick 10 is also shown. An ornamental article made according to the invention need not be a functional candle, and so may or may not be provided with a wick. Areas A, B, C, D, E and F may of course be varied in size and angle of inclination, and a greater or lesser number of layers may of course be made according to the invention.

Figure 11:
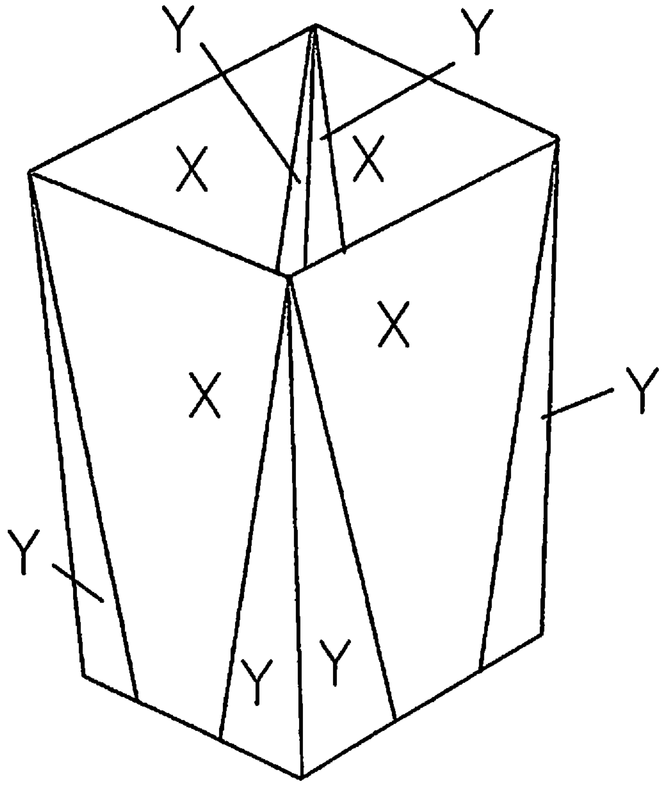
FIG. 11 is a pictorial view of an illustrative example of a vase made according to a preferred method of the invention.

The method and apparatus of the invention may also be employed, for example, to form a vase from wax or other suitable meltable material with tetrahedral corners and four flat sides. The sides have only a shallow layer of wax poured into the mold, and a layer of wax is added to form a bottom to the vase. An example of such a vase is shown in FIG. 11, where X and Y denote regions of different colors. It will be appreciated that many different patterns may be formed by this technique.

The apparatus described herein may be supplied, together with at least two colors of wax or a suitable meltable material and with suitable material for making molds, as a kit. Such a kit may also include a length of any suitable material for making candle wicks.

As will readily be appreciated by those skilled in the art, numerous modifications and variations of the above embodiments of the present invention are possible without departing from the scope of the invention.

What is claimed is:

1. A kit for making an ornamental article such as a candle or a vase from at least first and second meltable substances, said kit comprising:

a mold, where the mold defines an opening and is constructed of material suitable for containing the first and second meltable substances in melted form;

a rotating apparatus comprising a pair of side walls, a support, at least one support rotation member, and a mold rotation structure; wherein the at least one support rotation member supports the support from the side walls for rotation in elevation relative to the side walls;

the mold rotation structure supports the mold relative to the support for rotation in azimuth relative to the support;

the rotating apparatus supports the mold such that the first and second meltable substances in melted form may be poured through the opening as the mold is supported in a plurality of different positions in elevation and azimuth; and the rotating apparatus further supports the mold in each of the plurality of different positions in elevation and azimuth as the first and second meltable substances solidify to form portions of the ornamental article.

2. The kit according to claim 1, wherein:

rotation of the support relative to the side walls causes rotation of the mold in elevation; and rotation of the mold relative to the support causes rotation of the mold in azimuth.

3. The kit according to claim 2, wherein the rotating apparatus further comprises:

a mold holder for detachably securing the mold to the support as the rotating apparatus rotates the mold in elevation and azimuth.

4. The kit according to claim 1, further comprising: a supply of wick material, where the wick material is arranged within the container as the first and second meltable substances are poured into the mold through the opening.

5. The kit according to claim 1, wherein:

the first and second meltable substances comprise colored wax.

6. The kit as recited in claim 1, further comprising at least one support fixing member for engaging the at least one support rotation member to fix an angle of elevation of the support relative to the side walls.

7. The kit as recited in claim 6, in which the at least one support rotation member is formed by a bolt extending at least partly through the support.

8. The kit as recited in claim 6, in which the at least one support rotation member is formed by a bolt extending completely through the support.

9. The kit as recited in claim 8, further comprising at least one wing nut for engaging the at least one bolt to fix an angle of elevation of the support relative to the side walls.

10. The kit as recited in claim 6, in which the at least one support rotation member is formed by first and second studs extending partly through the support.

11. The kit as recited in claim 10, further comprising at least one knob for engaging at least one of the studs to fix an angle of Elevation of the support relative to the side walls.

12. The kit as recited in claim 1, further comprising at least one mold fixing member for engaging the support to fix an axial angle of the mold relative to the Support.

13. The kit as recited in claim 12, further comprising at least one wing nut for engaging the support to fix an axial angle of the mold relative to the support.

14. The kit as recited in claim 1, further comprising:

at least one support fixing member for engaging the at least one support rotation member to fix an angle of elevation of the support relative to the side walls; and at least one mold fixing member for engaging the support to fix an axial angle of the mold relative to the support.

15. The kit as recited in claim 1, further comprising a mold holder where the at least one mold rotation structure engages the mold and extends through the support to allow rotation of the mold in azimuth relative to the support.

16. The kit as recited in claim 1, further comprising:

at least one support fixing member for engaging the at least one support rotation member to fix an angle of elevation of the support relative to the side walls;

at least one mold fixing member for engaging the support to fix an axial angle of the mold relative to the support; and a mold holder, where the at least one mold rotation structure engages the mold and extends through the support to allow rotation of the mold in azimuth relative to the support.

* * * * *